(12) United States Patent
Heithoff et al.

(10) Patent No.: US 8,455,066 B2
(45) Date of Patent: Jun. 4, 2013

(54) LOW SOLAR ABSORBING BLUE GLASS, SOLAR REFLECTING COATED BLUE GLASS, AND INSULATING UNIT HAVING A LOW SOLAR HEAT GAIN

(75) Inventors: Robert B. Heithoff, Gibsonia, PA (US); Glenn T. Miner, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 13/589,353

(22) Filed: Aug. 20, 2012

(65) Prior Publication Data

US 2012/0315410 A1    Dec. 13, 2012

Related U.S. Application Data

(62) Division of application No. 11/692,220, filed on Mar. 28, 2007, now Pat. No. 8,268,741.

(60) Provisional application No. 60/786,606, filed on Mar. 28, 2006.

(51) Int. Cl.
| | |
|---|---|
| C03C 17/06 | (2006.01) |
| C03C 17/23 | (2006.01) |
| C03C 17/36 | (2006.01) |
| E06B 3/677 | (2006.01) |

(52) U.S. Cl.
USPC ............. 428/34; 428/432; 428/434; 428/699; 428/426; 501/71; 501/64

(58) Field of Classification Search
None
See application file for complete search history.

(56) References Cited

U.S. PATENT DOCUMENTS

| | | | | |
|---|---|---|---|---|
| 5,770,321 | A | * | 6/1998 | Hartig et al. ................. 428/622 |
| 5,792,559 | A | * | 8/1998 | Heithoff et al. .............. 428/437 |
| 6,998,362 | B2 | * | 2/2006 | Higby et al. .................... 501/71 |
| 2003/0101749 | A1 | * | 6/2003 | Lingle et al. .................. 65/60.2 |

* cited by examiner

*Primary Examiner* — David Sample
(74) *Attorney, Agent, or Firm* — Andrew C. Siminerio

(57) ABSTRACT

An insulating unit having a neutral grey color and a solar heat gain coefficient less than 0.40 includes a clear glass sheet spaced from a coated glass sheet. The coated glass sheet includes a colored glass substrate having a solar infrared reflective coating. The composition of the coated substrate includes a base glass portion and a glass colorant portion, the glass colorant portion including total iron in the range of 0.04 to less than 0.28 weight percent; CoO in the range of 32 to 90 parts per million, and Se in the range of greater than 0 to less than 5.5 parts per million. In one non-limiting embodiment of the invention the glass substrate at a thickness of 0.223 inches has a* chromaticity coordinates of −3.5 to +2.5 and b* chromaticity coordinates of −1 to −15, and a visible light transmittance of 40 to 80%.

20 Claims, No Drawings

LOW SOLAR ABSORBING BLUE GLASS, SOLAR REFLECTING COATED BLUE GLASS, AND INSULATING UNIT HAVING A LOW SOLAR HEAT GAIN

RELATED APPLICATIONS

This application is a divisional of application Ser. No. 11/692,220 filed Mar. 28, 2007. This application claims the benefit of U.S. Provisional Patent Application Ser. No. 60/786,606 filed on Mar. 28, 2006 and titled "BLUE GLASS COMPOSITION", which application is hereby incorporated by reference.

FIELD OF THE INVENTION

This invention relates to a low solar absorbing blue glass, and more particularly to a low iron blue glass composition and blue glass substrate, e.g. a glass sheet cut from a glass ribbon made using a continuous flat glass making process; to a solar reflecting coated blue glass, and more particularly, to the low solar absorbing blue glass composition having a low emissivity coating, and to an insulating glass unit having a low solar heat gain, and more particularly, to an insulating glass unit having the coated blue glass as one of the sheets of the insulating glass unit.

BACKGROUND OF THE INVENTION

Insulating glass (IG) units are preferred windows in residential and commercial buildings because they reduce energy transmittance through the window. As is appreciated by those skilled in the art, reducing energy transmittance through the IG unit reduces heat losses from the building interior during the winter, and reduces heat gain to the building interior during the summer. In general, the unit construction determines conductive and convective heat losses, and the absorption and reflection properties of the glass sheets of the IG unit control solar energy heat gain of the IG unit, an important parameter in commercial buildings. At the present time, a highly desirable commercial product is an IG unit with mid-range visible transmittance, low solar heat gain coefficient (SHGC), and neutral gray color. Of particular interest in the following discussion are the absorption, transmittance, reflectance, and color properties of the glass sheets of the IG unit. For a discussion of reducing conductive and convective heat loss of an IG unit reference can be made to U.S. Pat. No. 5,655,282, which patent is hereby incorporated by reference.

In general, increasing the amount of total iron content in the glass composition increases solar infrared ("IR") energy absorption of the glass thereby reducing the IR transmittance. For example, a typical gray tinted float glass with the mid-range visible transmittance, e.g. 40-60% in the wavelength range of 380-770 nanometers of the electro-magnetic spectrum, contains greater than 0.3 wt % iron. Unfortunately, because the glass surface has a high emissivity, a significant portion of the absorbed energy flows to the building interior. Another drawback with increasing the total iron in the glass to reduce IR transmittance is that the glass heats when exposed to sunlight. As is appreciated by those skilled in the art, heating the glass by IR absorption sets up thermal stresses in the glass that can result in fracturing the glass sheet. A discussion of colored glass is provided in U.S. Pat. Nos. 3,723,142 and 6,998,362, UK Patent Application GB 2,252,973, and Japanese Patent 63-277537, which documents are hereby incorporated by reference.

Another technique to reduce the IR transmittance of the glass is to apply an IR reflective coating, e.g., of the type described in U.S. Pat. No. 4,610,771 and in U.S. patent application Ser. Nos. 10/428,481 and 10/912,718, which documents are hereby incorporated by reference. IR reflective coatings also typically have reduced surface emissivity, also referred to as "low e" coatings, thereby reducing heat flow through the window. A drawback with this technique to reduce IR absorption of the glass is that the coated glass may not have an aesthetically appealing color or desired level of visible transmittance. For example, and not limiting the discussion thereto, in general, IR reflective coatings on float glass deposited by magnetic sputtering vacuum deposition ("MSVD") have a light green or yellow transmitted color. Using the MSVD IR coating with presently available glass substrates can have the following limitations. An IG unit having a coated clear glass sheet can have a high visible light transmittance, e.g. greater than 70%; an IG unit having a coated gray colored glass can have a low unit visible light transmittance, e.g. less than 36%; an IG unit having a coated blue/green or green colored glass is generally commercially considered too green in color, and an IG unit having a coated bronze colored glass is generally commercially considered too yellow in color.

Although, the presently available glasses coated with IR reflecting or low emissivity coatings are acceptable for some limited applications, they have limitations when used as one of the sheets of an IG unit. More particularly, several performance requirements of an IG unit include, but are not limited to, the IG unit having a low solar heat gain coefficient ("SHGC"), e.g. below 0.40, mid-range visible light transmittance of 40 to 60%, and a neutral gray color, e.g. a blue grey color. Using the presently available coated colored glass can provide an acceptable SHGC; however, if the color of the IG unit is not a neutral gray color, it has limited acceptability in the marketplace. One attempt to change the color of the coated glass to obtain an IG unit having a neutral gray color is to alter the color of the low e coating and apply the low e coating to clear glass. The color of the IG unit is more to the gray color; however, the SHGC of the IG unit is increased.

As can now be appreciated by those skilled in the art, it would be advantageous to provide a glass composition that can be used with presently available IR reflective coatings to provide a coated glass that can be used in an IG unit to provide an IG unit with a neutral blue gray color, a mid-range visible light transmittance, and a low SHGC.

SUMMARY OF THE INVENTION

This invention relates to a glass substrate having a glass composition having a base glass portion and a glass colorant portion. The base glass portion is a soda-lime-silica base portion, and the glass colorant portion includes, among other things, total iron expressed as $Fe_2O_3$ in the range of 0.04 to 0.28 weight percent; CoO in the range of 32 to 70 parts per million; Se in the range of 0.2 to 4.5 parts per million; a ratio of CoO to Se equal to or greater than 8. The weight percents and the parts per million are based on the final glass composition.

The invention further relates to a glass substrate having a glass composition having, among other things, a base glass portion and a glass colorant portion, the glass colorant portion having colorants in selected amounts to provide the glass substrate with chromaticity coordinates of a* in the range of −3.5 to +2.5 and b* in the range of −1 to −15, and a visible light transmittance of 40 to 80%, at a reference thickness of 0.223 inches (5.66 mm).

The invention still further relates to a coated glass having a glass substrate and a coating over a major surface of the glass substrate, the glass substrate includes, among other things, a base glass portion and a glass colorant portion, the glass colorant portion having colorants in selected amounts to provide the uncoated glass substrate with chromaticity coordinates of a* in the range of −3.5 to +2.5 and b* in the range of −1 to −15, and a visible light transmittance of 40 to 80%, at a reference thickness of 0.223 inches (5.66 mm), and the coated article has a coating hemispherical emissivity of no greater than 0.25.

The invention also relates to an improved insulating unit of the type having a coated glass sheet spaced from a clear glass sheet with space between edges of the pair of glass sheets sealed. The improvement includes, among other things, the coated sheet includes, among other things, a glass substrate. The glass substrate includes, among other things, a base glass portion and a glass colorant portion. The glass colorant portion includes colorants in selected amounts to provide the glass substrate with chromaticity coordinates of a* in the range of −3.5 to +2.5 and b* in the range of −1 to −15, and a visible light transmittance of 40 to 80% at a reference thickness of 0.223 inches (5.66 mm). The coated glass sheet has chromaticity coordinates of a* in the range of −7 to +2.0 and b* in the range of 3 to −13, and a visible light transmittance of in the range of 26 to 75%, at a thickness of 0.223 inches (5.66 mm), and a coating hemispherical emissivity of no greater than 0.25. The insulating unit has visible light transmittance of in the range of 26 to 67% and a solar heat gain coefficient of no greater than 0.50.

DESCRIPTION OF THE INVENTION

As used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges described herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g. 1.0 to 3.8, 6.6 to 9.7 and 5.5 to 10. Also, as used herein, the terms "deposited over", "applied over", or "provided over" mean deposited, applied, or provided on but not necessarily in surface contact with. For example, a material "deposited over" a substrate does not preclude the presence of one or more other materials of the same or different composition located between the deposited material and the substrate.

Before discussing non-limiting embodiments of the glass composition, the glass substrate or sheet, the coated glass substrate, and the IG unit, of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation.

The non-limiting embodiments of the invention are directed to glass compositions, glass substrates, coated glass substrates, and IG units, of the invention. For a full appreciation and understanding of the invention, the embodiments of the invention are described in the following order: embodiments of the glass composition of the invention, embodiments of the glass substrate of the invention, embodiments of the coated glass of the invention, and the embodiments of the IG unit of the invention.

The glass composition of the invention includes a base glass portion and a glass colorant portion to provide a glass substrate or sheet having predetermined color and solar control properties. In one non-limiting embodiment of the invention, the base glass portion is of the type referred to in the art as a "soda-lime-silica" glass composition and includes the components in the weight percent (wt %) ranges shown in Table 1 below. Unless indicated otherwise, the wt % of a component of the base glass portion, and of the glass colorant portion of the glass composition is based on the total weight of the glass composition, i.e. the total weight of the base glass portion plus the total weight of the colorant portion.

TABLE 1

Base Glass Portion

| Component | Weight Percent Based on the Total Weight of the Final Glass Composition |
|---|---|
| $SiO_2$ | 65-75 |
| $Na_2O$ | 10-20 |
| CaO | 5-15 |
| MgO | 0-5 |
| $Al_2O_3$ | 0-5 |
| $K_2O$ | 0-5 |
| BaO | 0-1 |

In one non-limiting embodiment of the invention, the colorants to obtain the predetermined color and solar performance properties of the invention include, but are not limited to iron oxides (both ferric oxide ($Fe_2O_3$) and ferrous oxide (FeO)), cobalt oxide (CoO), selenium (Se), chromium oxide ($Cr_2O_3$), neodymium oxide ($Nd_2O_3$), titanium oxide ($TiO_2$), erbium oxide ($Er_2O_3$) and nickel oxide (NiO).

According to the present invention, iron can be present in the glass composition as both ferric oxide ($Fe_2O_3$) and ferrous oxide (FeO). As is well known in the art, $Fe_2O_3$ is a strong absorber of ultraviolet radiation and is a yellow colorant, and FeO is a strong absorber of infrared radiation and is a blue colorant. The amount of iron present in the ferrous state ($Fe^{++}$) in the glass composition of the present invention is expressed in terms of the weight percentage of "FeO" present in the glass composition, as is standard practice in the industry. As is appreciated by those skilled in the art, although the amount of iron in the ferrous state ($Fe^{++}$) is expressed as FeO, the entire amount in the ferrous state ($Fe^{++}$) may not actually be present in the glass as FeO.

The amount of "total iron" present in the glass composition of the invention is expressed in terms of the weight percentage of "$Fe_2O_3$" present in the glass composition, as is standard practice in the industry. This does not imply that all of the iron present in the glass composition is in the form of $Fe_2O_3$. In the practice of the present invention, the total iron in the glass composition is in the range of 0.01 to 0.30 weight percent (wt %), preferably in the range of 0.04 to 0.28 weight percent, more preferably in the range of 0.08 to 0.26 weight percent, and most preferably in the range of 0.15 to 0.25 wt %. Glass compositions according to the present invention have a redox ratio of less than or equal to 0.6, preferably in the range of 0.05 to 0.40, more preferably in the range of 0.10-0.30, and most preferably in the range of 0.15 to 0.25. As used herein, the "redox ratio" is the amount of iron in the ferrous state (expressed as "FeO") divided by the amount of total iron (expressed as "$Fe_2O_3$").

Cobalt oxide (CoO) is a blue colorant and in the practice of the invention is added to the glass composition in an amount ranging from 30 to 120 parts per million ("ppm"), preferably in the range of 32 to 90 ppm, more preferably in the range of 35 to 60 ppm, and most preferably in the range of 37 to 50 ppm. Another colorant that can be used in the practice of the invention is selenium which can exist in glass in four oxidation states: $Se^{+4}$ and $Se^{+2}$, which add no color to the glass, $Se^0$, which in the glass is a pink colorant, and $Se^{-2}$, which in the presence of iron is a bronze colorant. As is the standard practice in the industry, total selenium is expressed as weight fraction of Se even though it may not be in the elemental state in the glass. Selenium is included in the glass composition of the invention in an amount no greater than 6 ppm, preferably from 1 to 5.5 ppm, more preferably from 2 to 5 ppm and most preferably from 3 to 5 ppm. In a non-limiting embodiment of the invention, the glass composition of the present invention has a weight percent ratio of CoO to Se equal to or greater than 5. As the ratio of CoO to Se increases and the amount of the other colorants in the glass composition remain constant, the color of the glass is more blue, and as the ratio of CoO to Se decreases and the amount of the other colorants in the glass composition remain constant, the color of the glass is less blue and more yellow. In other non-limiting embodiments of the invention, the weight percent ratio of CoO to Se is preferably at least 6, more preferably at least 7, and most preferably at least 8.

In a non-limiting embodiment of the glass composition of the invention, the glass colorant portion can include a mixture of chrome oxide and cobalt oxide to reduce the wt % of iron oxide. For example and not limiting to the invention, a mixture of 6 ppm $Cr_2O_3$ and 0.4 ppm CoO can be added for each reduction of 100 ppm of $Fe_2O_3$.

In another non-limiting embodiment of the glass composition of the invention, neodymium oxide, a blue colorant, can be included in the composition to reduce the wt % of cobalt oxide. For example and not limiting to the invention, 180 ppm neodymium oxide expressed as $Nd_2O_3$ can be added for every 1 ppm reduction of CoO.

Although not limiting to the invention, in the preferred practice of the invention nickel oxide is excluded from the glass composition because of the tendency to form nickel sulfide stone defects, which can cause spontaneous breakage in tempered glass. However, in those instances when environmental concerns restrict the use of selenium, nickel oxide, titanium oxide, and also erbium oxide, an expensive glass colorant, can be used to reduce the wt % of selenium. For example and not limiting to the invention, a mixture of 35 ppm nickel oxide as NiO, a yellow colorant in glass, and 1 ppm of CoO can replace a mixture of 1 ppm of Se and 700 ppm $Fe_2O_3$.

In another non-limiting embodiment of the invention, a mixture of 4000 ppm erbium oxide as $Er_2O_3$, a pink colorant, and 1200 ppm $Fe_2O_3$ can replace a mixture of 1 ppm Se and 6 ppm CoO. Furthermore, a mixture of 1600 ppm titanium oxide as $TiO_2$, a yellow colorant, and 4 ppm CoO can replace a mixture of 1 ppm Se and 600 ppm $Fe_2O_3$.

Other colorants that can be used in the practice of the invention include but are not limited to oxides of manganese, tin, cerium, molybdenum, vanadium, copper, zinc, tungsten and lanthanum. More particularly and not limiting to the invention, 1000 ppm of $MnO_2$, a yellow colorant in glass, can replace a mixture of 1 ppm Se and 200 ppm $Fe_2O_3$.

In a non-limiting embodiment of the invention, the described glass composition is formed into a glass substrate using any conventional glass making process known in the art, and preferably using a continuous flat glass making process. For example but not limiting to the invention, the glass composition can be formed from batch materials via crucible melts, a sheet drawing process, a float glass process, etc. In the preferred practice of the invention, the glass is melted and refined in a continuous, large-scale, commercial glass melting operation and formed into flat glass sheets of varying thickness, e.g. but not limiting to the invention up to 25 millimeters ("mm") by the float process in which the molten glass is supported on a pool of molten metal, usually tin, as it assumes a ribbon shape and is cooled, in a manner well known in the art.

Although it is preferred that the glass described herein be made using a conventional, overhead fired continuous melting operation, as is well known in the art, the glass can also be produced using a multi-stage melting operation, as described in U.S. Pat. No. 4,381,934 to Kunkle, et al., U.S. Pat. No. 4,792,536 to Pecoraro, et al. and U.S. Pat. No. 4,886,539 to Cerutti, at al. If required, a stirring arrangement can be employed within the melting and/or forming stages of the glass production operation to homogenize the glass in order to produce glass of the highest optical quality. Depending on the type of melting operation, sulfur can be added to the batch materials of a soda-lime-silica glass as a melting and refining aid. Commercially produced float glass can include up to about 0.3 wt % $SO_3$. In a glass composition that includes iron and sulfur, providing reducing conditions can create amber coloration which lowers luminous transmittance as discussed in U.S. Pat. No. 4,792,536 to Pecoraro, et al. However, it is believed that the reducing conditions required to produce this coloration in float glass compositions of the type described herein are limited to approximately the first 20 microns of the lower glass surface contacting the molten tin during the float forming operation, and to a lesser extent, to the exposed upper glass surface. Because of the glass low sulfur content and the limited region of the glass in which any coloration could occur, depending on the particular soda-lime-silica glass composition, sulfur in these surfaces essentially has no material effect on the glass color or spectral properties.

It should be appreciated that as a result of forming the glass on molten tin as discussed above, measurable amounts of tin oxide may migrate into surface portions of the glass on the side contacting the molten tin. Typically, a piece of float glass has an $SnO_2$ concentration ranging from about 0.05 to 2 wt % in about the first 25 microns below the surface of the glass that was in contact with the tin. Typical background levels of $SnO_2$ can be as high as 30 ppm. It is believed that high tin concentrations in about the first 10 angstroms of the glass surface supported by the molten tin can slightly increase the reflectivity of that glass surface; however, the overall impact on the glass properties is minimal.

As is appreciated by those skilled in the art of glass making, a result of the raw materials and/or equipment used to produce glass, including producing glass of the present invention, results in certain impurities, for example, SrO and $ZrO_2$, being present in the final glass composition. Such materials are present in the glass composition in minor amounts and are referred to herein as "tramp materials". By way of illustration and not limiting to the invention, it is believed that glass compositions of the instant invention produced by a commercial float process as discussed earlier can include low concentrations, e.g. tramp levels of colorants, e.g. $Cr_2O_3$, $MnO_2$ and $TiO_2$. These levels are referred to as "tramp levels" because they do not materially affect the color characteristics and spectral properties of the blue glass of the invention. For example and not limiting to the invention, $Cr_2O_3$ in amounts no greater than 10 ppm is considered a tramp material; $MnO_2$ in amounts no greater than 50 ppm is considered a tramp material, and $TiO_2$ in amounts no greater than 0.02 wt % is considered a tramp material.

In a non-limiting embodiment of the invention, a glass substrate of the present invention at a thickness of 0.223 inches (5.66 mm) exhibits the following properties:

1. a color described by the following chromaticity coordinates of a* ranging from −4 to +4 and b* ranging from 0 to −20; preferably a* ranging from −3.5 to +2.5 and b* ranging from −1 to −15; more preferably a* ranging from −3 to +1 and b* ranging from −2 to −12; most preferably ranging from a* −2.5 to 0, and b* ranging from −4 to −9, and more narrowly ranging from a* −1.8 to −0.5 and b* −5 to −8. Glasses with these color coordinates are considered blue-violet in color.
2. a visible light transmittance ("Tvis") ranging from no greater than 80%, preferably 40% to 80%, more preferably from 50% to 76%, most preferably from 55% to 72%, and more narrowly 58 to 70%.

According to the present invention, the above-mentioned properties of the glass are measured as follows. The visible light transmittance (Tvis) represents a computed value based on measured transmittance data using CIE standard illuminate "D65" and CIE 1931 standard (2°) observer over the wavelength range of 380 to 770 nanometers at 10 nanometer intervals. Color is described in terms of chromaticity coordinates a* and b* which represent computed values based on measured transmittance data using CIE standard illuminate "D65" and CIE 1964 supplementary standard (10°) observer. Transmitted data are collected with a Perkin-Elmer Lambda 9 spectrophotometer with a 150 mm Labsphere integrating sphere lined with Spectralon, following the methodology of ASTM E903-96, "Standard Test Method for Solar Absorptance, Reflectance, and Transmittance of Materials using Integrating Spheres." Calculation of Tvis (also known as tristimulus value "Y") and chromaticity coordinates follows the methodology found in ASTM E308-90, "Standard Test Method for Computing the Colors of Objects Using the CIE System."

EXAMPLES

Non-limiting embodiments of the present invention are illustrated by the following non-limiting examples, Examples 1-6 were made in the following manner.

Batch materials were weighed according to the batch formulae given for Examples 1-6 in Table 2 below. All materials weights are in grams. The batch materials for each Example 1-6 were mixed and melted in a 4 inch platinum crucible in an electric resistance furnace in an air atmosphere set to a temperature of 2450° F. (1343° C.). The temperature of the furnace was increased after each of three (3) thirty (30) minute periods. More particularly, after the first 30 minutes period, the furnace temperature was increased to 2500° F. (1371° C.); after the second 30 minutes period, the furnace temperature was increased to 2550° F. (1399° C.), and after the third 30 minutes period, the furnace temperature was increased to 2600° F. (1426° C.) and held at 2600° F. (1426° C.) for a 1 hour. After the one hour, the crucible was removed from the furnace and poured into water at room temperature (referred to as "glass fritting" in the art) to produce a glass frit. The frit was dried, returned to a platinum crucible, and placed in a furnace set to a temperature of 2650° F. (1454'C). After 2 hours the contents of the crucible were cast on a metal table. The resulting glass sheet was placed into an annealing oven set to 1100° F. (593° C.) for one hour at which time the power to the oven was shut off, and the glass sheet was allowed to cool slowly for sixteen hours. Samples cut from the glass sheet were ground and polished, and the color, and visible light transmittance of the samples were measured, and chemical analysis of the samples was made.

Examples 7 to 10 on Table 2 are batch materials for glass experimental runs made with the float glass process practiced by PPG Industries, Inc, at its Wichita Falls, Tex. facility. The weight of the ingredients for Examples 1-6 are in grams, and the weight of the ingredients for Examples 7-10 are in pounds.

TABLE 2

| Glass Batch Materials | | | | | | | | | | |
|---|---|---|---|---|---|---|---|---|---|---|
| Ingredient | Ex. 1 | Ex. 2 | Ex. 3 | Ex. 4 | Ex. 5 | Ex. 6 | Ex. 7 | Ex. 8 | Ex. 9 | Ex. 10 |
| Sand | 335 | 335 | 335 | 335 | 335 | 335 | 1000 | 1000 | 1000 | 1000 |
| Soda Ash | 110 | 110 | 110 | 110 | 110 | 110 | 263 | 263 | 263 | 260 |
| Caustic | — | — | — | — | — | — | 44 | 44 | 44 | 44 |
| Limestone | 28.5 | 28.5 | 28.5 | 28.5 | 28.5 | 28.5 | 147 | 147 | 147 | 146 |
| Dolomite | 81 | 81 | 81 | 81 | 81 | 81 | 178 | 178 | 178 | 188 |
| Salt cake | 2.35 | 2.35 | 2.35 | 2.35 | 2.35 | 2.35 | 8.5 | 8.5 | 8.5 | 8.5 |
| Sodium | — | — | — | — | — | — | 4.8 | 4.8 | 4.8 | 4.8 |
| Clear cullet | 240 | 240 | 240 | 240 | 240 | 240 | — | — | — | — |
| Bronze/clear cullet | — | — | — | — | — | — | 2350 | 2350 | 2350 | 2360 |
| Rouge | 0.95 | 0.95 | 0.34 | 0.34 | 0.34 | 0.34 | 0.202 | 0.202 | 2.50 | 2.29 |
| $Co_3O_4$ | 0.331 | 0.331 | 0.394 | 0.394 | 0.316 | 0.300 | 0.066 | 0.066 | 0.066 | 0.080 |
| Se | 0.0149 | 0.0153 | 0.0134 | 0.0134 | 0.0153 | 0.0186 | 0.017 | 0.017 | 0.017 | 0.012 |
| Coal | 0.402 | 0.412 | 0.409 | 0.458 | 0.436 | 0.503 | 0.088 | 0.088 | 0.088 | 0.088 |

Chemical analyses of glass made from the batch materials for Examples 1-10 are shown below in Table 3. One or more of the compositions of Examples 1-10 may have contained the following non-effective tramp materials which are not included in the table SrO, $ZrO_2$, Cl and BaO.

Table 4 below includes glass colorants, CoO/Se ratio, and the redox ratio of Examples 11-26 of the invention. The modeled glass properties (e.g., Tvis, a* and b*) of Examples 11-26 were generated by a glass color and spectral performance computer model developed by PPG Industries, Inc., a

TABLE 3

Glass Compositions of Examples 1-10

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| $SiO_2$ (wt %) | 72.94 | 72.92 | 73.14 | 73.11 | 73.11 | 73.09 | 72.70 | 72.68 | 72.63 | 71.47 |
| $Na_2O$ (wt %) | 13.77 | 13.79 | 13.75 | 13.73 | 13.92 | 13.76 | 13.89 | 13.91 | 13.97 | 14.04 |
| CaO (wt %) | 9.32 | 9.34 | 9.26 | 9.31 | 9.10 | 9.32 | 9.98 | 10.00 | 9.92 | 10.02 |
| MgO (wt %) | 3.39 | 3.39 | 3.36 | 3.37 | 3.42 | 3.40 | 2.88 | 2.87 | 2.83 | 2.85 |
| $Al_2O_3$ (wt %) | 0.10 | 0.08 | 0.08 | 0.08 | 0.08 | 0.08 | 0.10 | 0.10 | 0.09 | 0.10 |
| $K_2O$ (wt %) | 0.03 | 0.03 | 0.03 | 0.03 | 0.03 | 0.03 | 0.05 | 0.05 | 0.059 | 0.059 |
| $Fe_2O_3$ (wt %) | 0.190 | 0.190 | 0.105 | 0.104 | 0.102 | 0.102 | 0.100 | 0.100 | 0.201 | 0.180 |
| CoO (ppm) | 43 | 41 | 50 | 52 | 39 | 39 | 50 | 48 | 43 | 46 |
| Se (ppm) | 4 | 4 | 4 | 4 | 3 | 3 | 10 | 8 | 3 | 4 |
| CoO/Se ratio | 10.8 | 10.3 | 12.5 | 13 | 13 | 13 | 5.0 | 6.0 | 14.3 | 11.5 |
| Redox ratio | 0.243 | 0.251 | 0.226 | 0.241 | 0.276 | 0.299 | 0.242 | 0.251 | 0.199 | 0.233 |
| Tvis (%) | 65.8 | 66.3 | 66.3 | 65.1 | 69.9 | 69.6 | 59.6 | 65.34 | 66.08 | 65.04 |
| a* | −2.16 | −2.24 | −1.37 | −1.51 | −1.48 | −1.43 | 1.13 | 0.69 | −1.26 | −1.26 |
| b* | −5.37 | −5.15 | −7.66 | −8.02 | −5.57 | −5.77 | −8.1 | −5.53 | −5.94 | −6.44 |

Base glass composition and colorant composition are measured by X-ray Fluorescence Spectrophotometry (XRF) using a Rigaku model 3370. FeO wt % is determined from the formula:

$$FeO(wt\%) = \log(91.93/T_{1000\,nm})/(d/21.5)$$

where:

$T_{1000\,nm}$ = transmittance at 1000 nm
d = glass thickness (inches)

proprietary computer program relating properties of colorants, more specifically the wavelength dependent absorption coefficients and the concentrations of colorants, to glass spectral prosperities and color. A description of the methodology can be found in the publication "*Modeling Transmitted Color and Solar Optical Properties of Float Glass*", by Robert B. Heithoff, PPG Technology Journal Volume 5, Number 1, April 1999.

TABLE 4

Colorant Concentrations and Properties of Computer Modeled Glasses at a Thickness of 0.223 inch (5.66 mm)

|  | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|
| $Fe_2O_3$ wt. % | 0.198 | 0.216 | 0.01 | 0.01 | 0.01 | 0.15 | 0.30 | 0.30 | 0.22 | 0.19 |
| CoO ppm | 43 | 47 | 31 | 70 | 120 | 120 | 31 | 120 | 50 | 43 |
| Se ppm | 3 | 3.3 | 5.9 | 5.9 | 5.9 | 5.9 | 1 | 1 | 2.9 | 3.6 |
| $Cr_2O_3$ ppm | 6 | 6 | 6 | 6 | 6 | 6 | 6 | 6 | 6 | 6 |
| $TiO_2$ ppm | 90 | 90 | 90 | 90 | 90 | 90 | 90 | 90 | 90 | 90 |
| CoO/Se ratio | 14 | 13 | 5.3 | 12 | 20.3 | 20.3 | 31 | 120 | 17 | 12 |
| Redox ratio | 0.20 | .20 | 0.30 | 0.30 | 0.30 | 0.25 | 0.20 | 0.20 | 0.15 | 0.30 |
| Tvis (%) | 65.8 | 63.9 | 68.7 | 57.0 | 45.1 | 43.2 | 71.0 | 46.9 | 64.0 | 64.1 |
| a* | −1.21 | −1.28 | 3.23 | 2.27 | 2.08 | 0.56 | −3.55 | −3.32 | −1.27 | −1.29 |
| b* | −5.81 | −6.30 | −1.41 | −9.65 | −19.2 | −18.7 | −4.58 | −22.0 | −6.56 | −6.46 |

TABLE 4-continued

Colorant Concentrations and Properties of Computer Modeled
Glasses at a Thickness of 0.223 inch (5.66 mm)

| | Ex. 21 | Ex. 22 | Ex. 23 | Ex. 24 | Ex. 25 | Ex. 26 |
|---|---|---|---|---|---|---|
| $Fe_2O_3$ wt. % | 0.12 | 0.22 | 0.15 | 0.34 | 0.16 | 0.20 |
| CoO ppm | 51 | 37 | 48 | 41 | 51 | 47 |
| Se ppm | 3.3 | 3.3 | 2.3 | 2.3 | 2.3 | 2.3 |
| $Cr_2O_3$ ppm | 66 | 6 | 6 | 6 | 6 | 6 |
| $Nd_2O_3$ ppm | — | 1800 | — | — | — | — |
| $Er_2O_3$ ppm | — | — | — | 4000 | — | — |
| $TiO_2$ ppm | 90 | 90 | 90 | 90 | 1600 | 90 |
| NiO ppm | — | — | 35 | — | — | — |
| $MnO_2$ ppm | — | — | — | — | — | 1000 |
| CoO/Se ratio | 15 | 11 | 21 | 18 | 22 | 20 |
| Redox ratio | 0.20 | 0.20 | 0.20 | 0.20 | 0.20 | 0.20 |
| Tvis | 64.0 | 64.0 | 64.0 | 64.0 | 64.3 | 65.4 |
| a* | −1.12 | −1.42 | −1.27 | −1.38 | −1.19 | −1.86 |
| b* | −6.13 | −6.45 | −6.29 | −6.14 | −6.27 | −6.63 |

As can now be appreciated by those skilled in the art, the colored glasses of the invention have an unusual blue violet color because of the low total iron content (up to 0.3 wt %) and high CoO/Se ratio (equal to and greater than 5), which in accordance to the teachings of the invention is preferred for producing glass substrates for use with IR reflective or low e green or yellow coatings to produce coated IR reflective glass products having a neutral blue gray color. More particularly, the glass compositions of the instant invention contain low amounts of total iron, e.g. up to 0.3 weight percent, which is less than the total iron found in the composition of tinted or colored substrates presently used in IG units. As discussed above, the total iron is added to tint or color the substrates and to absorb solar energy. In the practice of the invention, the loss of solar properties, e.g. the reduction in percent of IR absorption of the glass substrate or sheet, because of the reduction of total iron is compensated for by coating the glass substrates of the invention with an IR reflective or low e coating. The IR range of concern is 0.8-40 microns of the electro magnetic spectrum.

The discussion is now directed to non-limited embodiments of the coated article of the invention which include the glass substrate having the compositions and properties discussed above; an IR reflective and low emissivity coating applied to a major surface of the glass substrate to provide a coated article having a predetermined color having an a* ranging from −7 to 2, preferably −6 to 0.5, more preferably −5.5 to 0, and a b* ranging from 3 to −13, preferably from 2 to −9, more preferably 1 to −7; a visible light transmittance ("Tvis") ranging 36 to 75%, preferably from 36 to 71%, and more preferably from 41 to 67%; and a coating hemispherical emissivity of no greater than 0.25, preferably no greater than 0.10, more preferably no greater than 0.05. Hemispherical emissivity (represented by the term "$e_h$," and also herein represented by the term "eh") refers to the property of reflecting thermal infrared energy and is a performance parameter in measuring the solar heat gain coefficient ("SHGC") for IG units (discussed in more detail below). Hemispherical emissivity is calculated from measured IR reflectance over the wavelength range from 5 to 40 micron using a Mattson Galaxy FTIR 5030 spectrophotometer and the methodology of ASTM E1585-93, "Standard Method for Measuring and Calculating Emittance of Architectural Flat Glass Products Using Spectrometric Measurements"

IR reflecting and low emissivity coatings (hereinafter also referred to as "low e coatings") that can be used in the practice of the invention include, but are not limited to vacuum sputtered coatings having one or more infrared reflecting films, and low e pyrolytic coatings. In general, a sputtered low e coating includes, but is not limited to a metal or metal alloy film selected from gold, platinum, copper, silver, as well as alloys and mixtures of these metals, and dielectric films selected from an oxide of a metal, metal alloy or a ceramic, e.g. but not limited to zinc stannate, zinc oxide, and aluminum doped zinc oxide. As is appreciated by those skilled in the art, the dielectric films reduce the visible light reflectance of the metal film to increase the Tvis of the coating with minimal reduction in the IR reflectance of the metal film. Low e pyrolytic coatings, in general, include an IR reflective metal oxide film, e.g. but not limited to a tin or indium oxide film, and a color suppression film, e.g. but not limited to an $SiO_2$ or a graded film of $SiO_2$ and $SnO_2$ film pyrolytically deposited on a glass substrate or glass ribbon. Examples of low e coatings that can be used in the practice of the invention, include, but are not limited to, coatings of the Sungate and Solarban family of coatings, commercially available from PPG Industries, Inc. Sungate and Solarban are registered trademarks of PPG industries Ohio, Inc.

As is appreciated by those skilled in the art, by selecting films of different materials, e.g. IR reflecting films of different materials and different thicknesses, the color of the low e coating and subsequently the color of the substrate can be altered to provide a coated article having color coordinates different than the color coordinates of the substrate and the coating. A more detailed discussion of this effect is provided in U.S. patent application Ser. No. 09/434,823 filed Nov. 5, 1999 in the name of George Neuman, which patent application is hereby incorporated by reference.

A magnetic sputtering vacuum deposition ("MSVD") coatings that can be used in the practice of the invention is a Sungate 100 coating of the type described in U.S. Pat. No. 4,610,771, which patent is hereby incorporated herein by reference. In general, the Sungate 100 coating has a first dielectric film having a thickness in the range of 120-500 angstroms overlaying a major surface of the substrate, a silver film having a thickness in the range of 80-130 angstroms overlaying the dielectric film, a titanium film having a thickness in the range of 15-40 angstroms overlaying the silver film, a second dielectric film having a thickness in the range of 120-500 angstroms overlaying the titanium film, and a titanium oxide overcoat having a thickness of 30-80 angstroms overlaying the second dielectric film. The Sungate 100 coating on clear glass is identified in the Window 5.2 Program (discussed in more detail below) by the designation "S100CL-6.PPG." A glass substrate of the invention having the properties shown in Table 5 and having a Sungate 100 coating from "S100CL-6.PPG" was modeled using the Window 5.2 Program, and the coated article had the spectral properties shown in Table 5. Based on the information shown in Table 5, an article of the invention having a Sungate 100 coating deposited over a major surface of a colored glass substrate of the invention is expected to have a Tvis in the range of 45 to 71%; color coordinates of a* in the range of −3.5 to 0.5 and b* in the range of 0 to −8, and coating eh of no greater than 0.25.

Another MSVD coating that can be used in the practice of the invention is a Solarban 60 coating of the type described in U.S. patent application Ser. No. 10/912,718, which patent application is hereby incorporated herein by reference. In general, the Solarban 60 coating includes a first dielectric layer having a total thickness of at least 290 angstroms overlying a major surface of the substrate; a first infrared-reflective metal layer having a thickness ranging from 100 to 130 angstroms overlying the first dielectric layer; a first primer layer having a thickness ranging from 0.5 to 60 angstroms overlying the first infrared-reflective metal layer; a second dielectric layer overlying the first primer layer having a total thickness ranging from 680 to 870 angstroms; a second infrared-reflective metal layer having a thickness ranging from 115 to 150 angstroms overlying the second dielectric layer; a second primer layer having a thickness ranging from 0.5 to 60 angstroms overlying the second infrared-reflective metal layer; and a third dielectric layer having a total thickness ranging from 190 to 380 angstroms overlying the second primer layer, and a protective overcoat overlying the third dielectric layer. The Solarban 60 coating on clear glass is identified in the Window 5.2 Program (discussed in more detail below) by the designation "SB60clear-6.PPG." A glass substrate of the invention having the properties shown in Table 5 and having a Solarban 60 coating from "SB60clear-6.PPG" was modeled using the Window 5.2 Program, and the coated article had the spectral properties shown in Table 5. Based on the information shown in Table 5, an article of the invention having a Solarban 60 coating deposited over a major surface of a colored glass substrate of the invention is expected to have a Tvis in the range of 43 to 69%, an a* in the range of −4.5 to 0 and a b* in the range of 0 to −8, and a coating eh of equal to or less than 0.10.

Still another MSVD coating that can be used in the practice of the invention is a Solarban 70XL coating of the type described in U.S. patent application Ser. No. 10/428,481 which application is hereby incorporated herein by reference. In general, the Solarban 70XL coating includes a first separation layer of one or more metal oxide films having a thickness of in the range of 50 to 1000 angstroms overlaying a major surface of the substrate; a first infrared reflective layer, e.g. a first silver film, having a thickness in the range of 100 to 200 angstroms overlying the first separation layer; a first titanium metal film overlying the first infrared reflective layer; a second separation layer of one or more metal oxide films having a thickness in the range of 50-1000 angstroms overlying the first titanium metal film; a second infrared reflective layer, e.g. a second silver film, having a thickness in the range of 100 to 200 angstroms overlying the second separation layer; a second titanium metal film overlying the second infrared reflective layer; a third separation layer of one or more metal oxide layers having a thickness in the range of 50-1000 angstroms overlying the second titanium metal film; a third infrared reflective layer, e.g. a third silver film having a thickness in the range of 100 to 200 angstroms overlying the third separation layer; a third titanium metal film overlying the third infrared reflective layer; a fourth separation layer of one or more metal oxide films having a thickness in the range of 50-1000 angstroms overlying the third titanium metal film and a titanium oxide protective film overlying the fourth separation layer. The Solarban 70 XL coating on clear glass is identified in the Window 5.2 Program (discussed in more detail below) by the designation "SB70XL clear-5.PPG." A glass substrate of the invention having the properties shown in Table 5 and having a Solarban 70XL coating from "SB70XL clear-5.PPG" was modeled using the Window 5.2 Program, and the coated article had the spectral properties shown in Table 5. Based on the information shown in Table 5, an article of the invention having a Solarban 70XL coating deposited over a major surface of a colored glass substrate of the invention is expected to have a Tvis in the range of 36 to 63%, an a* in the range of −6 to −2 and a b* in the range of 2 to −6, and a coating eh of no greater than 0.05.

As can be appreciated the spectral properties of the coated glass of the invention shown on Table 5 is not limiting to the invention and is provided for illustration only. The spectral properties of Tvis, a* and b*, and eh are calculated using "Window 5.2" (version 5.2.03) and "Optics 5" (version 5.1, m.p.2), computer programs from Lawrence Berkeley National Laboratory (LBNL; Berkeley, Calif.). The Window 5.2 computer program uses measured spectral data file, including peer reviewed files submitted by the manufacturer and approved by the National Fenestration Rating Council (NFRC, Silver Spring, Md.; release 14.6). The glass of the invention is sold identified by the trademark Optiblue.

TABLE 5

Properties of Glass of the Invention With and Without a Coating and at a Thickness of 0.223" (5.66 mm) Calculated by the Window 5.2 Computer Program

| | Tvis (%) | a* | b* | $e_h$ of the coating |
|---|---|---|---|---|
| Uncoated glass | 64.0 | −1.15 | −6.50 | — |
| PPG Sungate 100 coating on the glass | 58.9 | −1.61 | −4.57 | 0.096 |
| PPG Solarban 60 coating on the glass | 57.0 | −2.34 | −4.60 | 0.035 |
| PPG Solarban 70XL coating on the glass | 50.5 | −4.07 | −2.23 | 0.018 |

The discussion is now directed to the embodiments of the invention relating to an insulating unit having the coated sheet or substrate of the invention. In one non-limiting embodiment of the invention, the insulating unit includes a coated glass sheet of the invention spaced from a clear glass sheet by an air space. Other non-limiting embodiments of the invention include an IG unit having the coated glass of the invention and two or more clear glass sheets. The invention is not limited to the construction of the IG unit and in one non-limiting embodiment of the invention the side of a dosed spacer frame is secured to the clear glass by a layer of a moisture and gas impervious sealant-adhesive and the opposite side of the spacer frame is secured to the coated surface of the coated sheet by another layer of the sealant-adhesive. For a more detailed discussion of IG units having two or more glass sheets and the construction of IG units, reference can be made to U.S. Pat. Nos. 5,601,677 and 6,223,414, which patents are hereby incorporated by reference.

In the practice of the invention, an IG unit has a coated article of the invention spaced from a clear glass sheet. The coated article of the invention includes a glass substrate having a thickness of 0.223 inches (5.66 mm) and a low e coating as was discussed above. The coated article, the exterior sheet of the IG unit with the coating on its interior surface, is spaced 0.50 inch (12.7 mm) from the clear glass interior sheet by a dry air space. The clear glass sheet has a thickness of 0.223" (5.66 mm), a Tvis in the range of 87.5 to 89.0%, an a* in the range of −2.3 to −1.3 and b* in the range of 0.4 to −0.2.

An IG unit of the invention has a Tvis in the range of 21 to 68%, preferably from 31 to 64%, and more preferably from 36 to 60%; an a* in the range of −8 to 1 and a b* in the range of 3 to −13, and a solar heat gain coefficient ("SHGC") of equal to or less than 0.50, preferably equal to or less than 0.40, more preferably less than or equal to 0.33, and most preferably less than or equal to 0.31.

Using the computer programs discussed above, the measurements of the spectral properties of an IG unit using the coated glass of Table 5 were made and are listed on Table 6. The Environmental conditions in the program were set to NFRC 100-2001. The spectral properties of the IG unit of the invention are listed on Table 6 below.

TABLE 6

Spectral Properties of IG units of the Invention.

|  | Tvis (%) | a* | b* | SHGC |
|---|---|---|---|---|
| An IG unit having PPG Sungate 100 | 52.4 | −2.98 | −4.38 | 0.434 |
| An IG unit having PPG Solarban 60 | 50.7 | −3.70 | −4.27 | 0.314 |
| An IG unit having PPG Solarban 70XL | 45.0 | −5.25 | −2.09 | 0.227 |

The following expected performance of the IG unit of the invention were made using the computer programs and the conditions discussed above to generate Table 6. The expected spectral performance of the IG unit was determined using the outer range limits of the coated glass.

A Sungate 100 coated glass of the invention having a Tvis in the range of 45 to 71%: color coordinates of a* in the range of −3.5 to 0.5 and b* in the range of 0 to −8, and a coating eh of no greater than 0.25 used as the coated glass of an IG unit is expected to provide an IG unit of the invention having a Tvis of 36 to 64%, color coordinates of a* in the range of −5 to −1 and b* in the range of 0 to −8, and an SHGC no greater than 0.47.

A Solarban 60 coated article of the invention having a Tvis in the range of 43 to 69%; color coordinates of a* in the range of −4.5 to 0, and b* in the range of 0 to −8, and a coating eh of no greater than 0.10 used as the coated glass of an IG unit is expected to provide the IG unit of the invention having a Tvis of 36 to 63%, color coordinates of a* in the range of −6 to −1 and b* in the range of 0 to −8, and an SHGC of no greater than 0.35.

A Solarban 70XL coated article of the invention having a Tvis in the range of 36 to 63%, color coordinates of a* in the range of −6 to −2 and b* in the range of 2 to −6, and a coating eh of no greater than 0.05 used as the coated glass of an IG unit is expected to provide an IG unit of the invention having a Tvis of 31 to 57%, color coordinates of a* in the range of −7 to −3 and a b* in the range of 2 to −6, and an SHGC of no greater than 0.31.

It will be readily appreciated by those skilled in the art that modifications can be made to the invention without departing from the embodiments of the invention described in the foregoing description of the invention. Such modifications are to be considered as included within the scope of the invention. For example, but not limiting thereto, the glass can be tempered, annealed or heat-strengthened glass. The invention can be practiced on plastic substrates. The uncoated surface of the coated article and the outer surface of the clear glass sheets of the IG unit can be coated with water repellant coating sold under the trademarks Aquapel or Sunclean. Further, the invention contemplates making a laminate having the coated substrate of the invention secured to another glass or plastic sheet by an interlayer material. Since laminating sheets in particular glass sheets, is well known in the art, no further discussion is deemed necessary.

Accordingly, the particular embodiments described in detail hereinabove are illustrative only and are not limiting as to the scope of the invention, which is to be given the full breadth of the appended claims and any and all equivalents thereof.

We claim:

1. A coated glass article comprising, a glass substrate and a coating over a major surface of the glass substrate, the glass substrate comprising a base glass portion and a glass colorant portion, the glass colorant portion having colorants in selected amounts to provide the glass substrate with chromaticity coordinates of a* in the range of −3.5 to +2.5 and b* in the range of −1 to −15, and a visible light transmittance of 40 to 80% at a reference thickness of 0.223 inches (5.66 mm), and the coated glass article has a hemispherical emissivity of no greater than 0.25.

2. The coated glass article according to claim 1, wherein the coated article, has chromaticity coordinates of a* in the range of −7.0 to +2 and b* in the range of 3 to −13, and a visible light transmittance of in the range of 26 to 75% at a reference thickness of 0.223 inches (5.66 mm).

3. The coated glass article according to claim 2, wherein the glass substrate has chromaticity coordinates of a* in the range of −3 to +1 and b* in the range of −2 to −10 at a reference thickness of 0.223 inches (5.66 mm), and the coated glass article has chromaticity coordinates of a* in the range of −6 to +0.5 and b* in the range of 2 to −9, a visible light transmittance of in the range of 36 to 71% at a reference thickness of 0.223 inches (5.66 mm), and a hemispherical emissivity of no greater than 0.10.

4. The coated glass article according to claim 2, wherein the glass substrate comprises a base glass portion and a glass colorant portion, the glass colorant portion comprising:
   total iron in the range of 0.08 to 0.26 weight percent;
   CoO in the range of 35 to 60 parts per million,
   Se in the range of 1 to 5 parts per million, and
   a ratio CoO to Se, each expressed in parts per million, of least 7.

5. The coated glass article according to claim 4, wherein the coating is an infrared reflective coating comprising a silver film between a pair of dielectric films, and the coated glass article has a* chromaticity coordinates in the range of −3 to 0.5 and b* chromaticity coordinates in the range of 0 to −8, and a visible light transmittance of 45 to 71% at a reference thickness of 0.223 inches (5.66 mm).

6. The coated glass article according to claim 5, wherein the glass substrate has a* chromaticity coordinates in the range of −3 to +1 and b* chromaticity coordinates in the range of −2 to −10 at a reference thickness of 0.223 inches (5.66 mm).

7. The coated glass article according to claim 4, wherein the coated glass article has a hemispherical emissivity of no greater than 0.10.

8. The coated glass article according to claim 7, wherein the coating is an infrared reflective coating comprising a first silver film over a first dielectric film, a second dielectric film over the first silver film, a second silver layer over the second dielectric film, and a third dielectric film over the second silver film, and the coated glass article has a* chromaticity coordinates in the range of −4.5 to 0 and b* chromaticity coordinates in the range of 0 to −8, and a visible light transmittance in the range of 43 to 69% at a reference thickness of 0.223 inches (5.66 mm).

9. The coated glass article according to claim 8, wherein the glass substrate has a* chromaticity coordinates in the range of −3 to +1 and a b* chromaticity coordinates in the range of −2 to −10 at a reference thickness of 0.223 inches (5.66 mm).

10. The coated glass article according to claim 4, wherein the coated article has a hemispherical emissivity of no greater than 0.05.

11. The coated glass article according to claim 10, wherein the coating is an infrared reflective coating comprising a first silver film over a first dielectric film, a second dielectric film over the first silver film, a second silver layer over the second dielectric film, a third dielectric film over the second silver film a third silver film over the third dielectric film and a fourth dielectric film over the third silver film, and the coated glass article has a* chromaticity coordinates in the range of −6 to −2 and b* chromaticity coordinates in the range of 2 to −6, and a visible light transmittance in the range of 36 to 63% at a reference thickness of 0.223 inches (5.66 mm).

12. The coated glass article according to claim 11, wherein the glass substrate has a* chromaticity coordinates in the range of −3 to +1 and b* chromaticity coordinates in the range of −2 to −10 at a reference thickness of 0.223 inches (5.66 mm).

13. The coated glass article according to claim 1, wherein the glass substrate is a first glass sheet and further comprising a second glass sheet laminated to the first sheet with the coating between the first and second glass sheets.

14. The coated glass article according to claim 11, wherein the glass substrate comprises a glass composition comprising a base glass portion and a glass colorant portion, wherein the base glass portion is a soda-lime-silica base portion, and the glass colorant portion comprising:
total iron, expressed as $Fe_2O_3$, in the range of 0.04 to 0.28 weight percent;
CoO in the range of 32 to 90 parts per million;
Se in the range of 1 to 5.5 parts per million;
ratio of CoO to Se, each expressed in parts per million, equal to or greater than 6, wherein the weight percent and the parts per million are based on the final glass composition.

15. The coated glass article according to claim 14, wherein the glass substrate, further comprising at least one colorant selected from $Cr_2O_3$, $MnO_2$, $Nd_2O_3$, NiO, $TiO_2$ and $Er_2O_3$.

16. The coated glass article according to claim 14, wherein the glass composition has a redox ratio in the range of 0.05 to 0.40.

17. The coated glass article according to claim 14, wherein the base glass composition comprises:

| | |
|---|---|
| $SiO_2$ | 65 to 75 weight percent, |
| $Na_2O$ | 10 to 20 weight percent, |
| CaO | 5 to 15 weight percent, |
| MgO | 0 to 5 weight percent, |
| $Al_2O_3$ | 0 to 5 weight percent, |
| $K_2O$ | 0 to 5 weight percent, and |
| BaO | 0 to 1 weight percent. |

18. The coated glass article according to claim 4, wherein the redox ratio of the glass substrate is in the range of 0.10 to 0.30.

19. In an insulating unit of the type having a coated first glass sheet spaced a second glass sheet, with edges of the glass sheets sealed to provide a sealed space between the first and the second glass sheets, wherein the improvement comprises:
the coated glass sheet comprises a glass substrate comprising a base glass portion and a glass colorant portion, the glass colorant portion having colorants in selected amounts to provide the glass substrate with chromaticity coordinates of a* in the range of −3.5 to +2.5 and b* in the range of −1 to −15, and a visible light transmittance of 40 to 80% at a reference thickness of 0.223 inches (5.66 mm); and
the coated glass sheet has chromaticity coordinates of a* in the range of −7 to +2.0 and b* in the range of 3 to −13, and a visible light transmittance of in the range of 26 to 75% at a reference thickness of 0.223 inches (5.66 mm), and a hemispherical emissivity of no greater than 0.25.

20. The insulating unit according to claim 19, wherein the second glass sheet is an uncoated second glass sheet, the first and the second glass sheets are spaced at a distance from one another in the range of 0.25 to 0.75 inches, the sealed space containing a gas, and the uncoated second glass sheet having chromaticity coordinates of a* in the range of −2.3 to −1.3 and b* in the range of −2 to 0.4, and a visible light transmittance in the range of 87.5% to 89% at a reference thickness of 0.223 inches (5.66 mm); and
the insulating unit having visible light transmittance in the range of 26 to 67% and a solar heat gain coefficient of no greater than 0.50 at the coated first glass sheet and the uncoated second glass sheet reference thickness of 0.223 inches (5.66 mm).

* * * * *